United States Patent Office 3,632,789
Patented Jan. 4, 1972

3,632,789
PRODUCTION OF COATINGS FROM OLEFIN COPOLYMERS CONTAINING HYDROXYL GROUPS AND POLYISOCYANATES
Hans Wilhelm, Heinsheim, and Heinrich Hartmann and Klaus Gulbins, Limburgerhof, Germany, assignors to Badische Anilin- & Soda-Fabrik Aktiengesellschaft, Ludwigshafen (Rhine), Germany
No Drawing. Filed Dec. 5, 1968, Ser. No. 781,637
Claims priority, application Germany, Dec. 6, 1967, P 16 21 822.7
Int. Cl. C08g 22/08, 22/10
U.S. Cl. 260—33.6 UB                    11 Claims

ABSTRACT OF THE DISCLOSURE

Process for the production of coatings based on reaction products of polyisocyanates with copolymers containing hydroxyl groups which have been prepared by polymerization of the monomers in an organic liquid (which does not react with isocyanates in the presence of a soluble polymer) as the insoluble copolymer dispersed in the organic liquid.

This invention relates to a process for the production of coatings based on reaction products of polyisocyanates and copolymers having hydroxyl groups.

It is known that coatings can be prepared by reaction of polyisocyanates with copolymers containing hydroxyl groups obtained from ethylenically unsaturated monomers. Generally the polyisocyanate is added to a solution of the copolymer containing hydroxyl groups in an organic solvent which is inert to isocyanates and then applied to a substrate. The production of surface coatings by this method has the disadvantage that the solutions are highly viscous. It is possible as described in U.S. Pat. specification No. 2,381,063 to dispense entirely with the solvent and to mix the copolymer containing hydroxyl groups which is devoid of solvent direct with the polyisocyanate, but the copolymer mixture devoid of solvent is difficult to use because of the high viscosity. To facilitate the processing of the copolymer solution it is therefore customary to use copolymers containing hydroxyl groups which have a fairly low molecular weight. This, however, impairs some of the properties of coatings prepared therefrom, particularly their elasticity. Moreover it involves the addition of a larger amount of the fairly expensive polyisocyanate than would be the case with products having higher molecular weight.

It is an object of this invention to prepare surface coatings which contain high molecular weight copolymers having hydroxyl groups. Another object is to produce these copolymers in the highest possible concentration and yet having a viscosity which ensures good processability with polyisocyanates. A further object is to provide coatings which, as reaction products of these copolymers containing hydroxyl groups with relatively small amounts of polyisocyanate, are distinguished particularly by elasticity and hardness after baking.

We have found that the said objects are achieved and coatings can be prepared particularly advantageously by reaction of polyisocyanates with copolymers (A) which contain polymerized units of (a) at least 30% by weight of an ester of an olefinically unsaturated carboxylic acid having three to five carbon atoms and alcohols having one to eight carbon atoms or a vinyl ester of an alkane monocarboxylic acid having two to five carbon atoms or mixtures of these esters;
(b) 2 to 40% by weight of an olefinically unsaturated monomer having an alcoholic hydroxyl group;
(c) 0 to 15% by weight of an olefinically unsaturated carboxylic acid having three to five carbon atoms; with or without one or more other olefinically unsaturated monomers whose polymerized units do not react with isocyanates under the reaction conditions, by using for the reaction a dispersion of copolymer (A) in an organic liquid which does not react with isocyanates and in which the copolymer (A) is insoluble, which has been prepared by polymerization of the monomers making up the copolymer in the organic liquid in the presence of a polymer (B) which is compatible with copolymer (A), which is soluble in the organic liquid and which has a dispersive effect and which has been prepared from at least one monomer whose polymerized units to the extent of at least 70% by weight do not react with isocyanates under the reaction conditions.

Organic liquids which are liquid within the range from −20° C. to +30° C. and have a boiling point of from 30° to 300° C., particularly from 50° to 200° C., are suitable as organic liquids in which the dispersions according to this invention are prepared. These liquids are particularly hydrocarbons of aromatic, aliphatic, hydroaromatic or araliphatic nature and also include for example ketones, ethers or esters or mixtures of organic liquids. Examples of very suitable hydrocarbons are hexane, heptane, octane, nonane, cyclohexane, white spirit, gasoline, xylene mixtures, terpenes and solvent naphthas. Obviously mixtures of these substances with one another may also be used. What is essential is that the copolymer (A) containing hydroxyl groups should be substantially insoluble in the organic liquid. A certain small amount of solvent which dissolves or has a swelling effect on the copolymer (A) may however be present.

The use of such solvents means that the viscosity of the copolymer dispersion formed can be regulated by having a smaller portion of the solvent soluble in the copolymer and the larger portion insoluble. Small amounts of paraffins or other solid hydrocarbons may also be added to the organic liquids. The organic solvent used should not react with isocyanate groups, i.e. it should not contain any active hydrogen atoms. Hydrocarbons having mainly non-aromatic constituents are preferred as organic liquids.

The copolymers (A) according to this invention for reaction with polyisocyanates should be prepared by polymerizing the monomers forming the components of copolymer (A) in the organic liquid in the presence of a dispersing polymer (B) which is compatible with the copolymer (A) and is substantially (preferably completely) soluble in the organic liquid used. Polymer (B) is advantageously used in amounts of 1 to 30%, preferably 2 to 20%, by weight with reference to the copolymer (A) (to be dispersed).

A homopolymer and particularly a copolymer of an olefinically unsaturated monomer(s) whose polymerized units consist to at least 70% by weight of units which do not react with polyisocyanates under the reaction conditions is suitable as the polymer (B). Polymer (B) is thus formed from at least 70% by weight, preferably more than 85% by weight of monomers which do not react with isocyanate groups and not more than 30%, preferably from 2 to 20%, by weight of monomers having groups which will react with isocyanates, preferably alcoholic hydroxyl groups. In some cases it is advantageous to use monomers containing carboxyl groups in an amount of from 0.1 to 10, preferably 0.5 to 5%, by weight. The type and amount of monomers chosen is determined mainly by the properties of polymer (B) required above. Polymers and copolymers which contain at least 40%, preferably from 60 to 95%, by weight of esters of olefinically unsaturated carboxylic acids with alcohols having from four to eighteen carbon atoms are very suitable. Appropriate esters of acrylic and/or methacrylic acid such as the n-butyl, octyl, lauryl, stearyl and preferably the 2-ethylhexyl esters are particularly suitable as esters of this type and the corresponding esters of maleic, fumaric or itaconic acid may also be used, but particularly in admixture with the acrylic and methacrylic esters. It is possible to use esters of alcohols having one to three carbon atoms such as methyl, ethyl or propyl esters in minor amounts, but in the preferred polymer (B) the average number of carbon atoms of the alcohol radicals of all the esters used should be at least four.

The usual olefinically unsaturated monomers having an alcoholic hydroxyl groups may be used as the monomers having hydroxyl groups in amounts of from 0.5 to 30%, preferably 5 to 20%, by weight. Examples are allyl alcohol, 1-vinyl-2-methylolimidazole, vinyl hydroxymethyl ketone, vinyl and allyl monoethers of polyhydric alcohols, particularly alkanediols such as 1,4-butanediol monovinyl ether, and as preferred monomers the monoesters of aliphatic dialcohols and polyalcohols with olefinically unsaturated carboxylic acids having three to five carbon atoms, particularly those of acrylic acid or methacrylic acid. Examples are the diglycol esters of itaconic acid, monoacrylates and monomethacrylates of ethylene glycol, diethylene glycol, propanediol-1,2, propanediol-1,3, pentanediol-1,2, butanediol-1,2, glycerol, trimethylolpropane and particularly butanediol-1,4. By introducing these monomers containing hydroxyl groups there is the great advantage that in the subsequent crosslinking with polyisocyanates the emulsifier is also crosslinked so that attack by water or organic solvents on the coating formed is made practically impossible. Monomers having carboxylic groups (in some cases advantageous and in amounts of less than 10%, preferably from 0.5 to 5%, by weight) are particularly the olefinically unsaturated carboxylic acids having three to five carbon atoms such as acrylic acid, methacrylic acid, crotonic acid or maleic acid.

Other non-reactive polymerizable compounds such as styrene and its homologs, and also N-vinyl compounds such as N-vinyllactams, for example N-vinylpyrrolidone, N-vinylcaprolactam, unsaturated carboxylic nitriles such as acrylonitrile, and olefinically unsaturated polymerizable amines such as N-vinylimidazole may be present as polymerized units in the dispersing polymers (B) (advantageously in amounts of up to 30% and particularly up to 20% by weight) in addition to the abovementioned compounds. The relative proportions of these components should be chosen so that the polymer (B) having a dispersing action formed remains substantially soluble in the liquid organic polymerization medium used.

Polymerization of the monomers for the copolymer (A) is preferably carried out at temperatures of from about 50° to 150° C. Conventional initiators forming free radicals which initiate the polymerization of the monomers at from about 50° to 150° C. such as peroxides or azo compounds, for example benzoyl peroxide or azoisobutyronitrile, may be used for the polymerization.

The following may be said concerning the copolymer (A):

(a) It is preferred to use, as the esters of monoolefinically unsaturated carboxylic acids having three to five carbon atoms and alcohols having one to eight carbon atoms and particularly alkanols having an average of from one to our atoms, the esters of acrylic acid and/or methacrylic acid, such as methyl acrylate, methyl methacrylate, ethyl acrylate, tert.-butyl acrylate, tert.-butyl methacrylate or mixtures of these esters with one another or with for example 2-ethylhexyl esters. Examples of vinyl esters of alkanemonocarboxylic acids having from two to five carbon atoms are vinyl acetate, vinyl propionate or vinyl pivalate;

(b) The olefinically unsaturated monomers having at least one alcoholic hydroxyl group, which are used in an amount of from 1 to 40%, preferably from 5 to 25%, by weight may be those mentioned above in relation to polymer (B);

(c) In special cases olefinically unsaturated carboxylic acids having from three to five carbon atoms, particularly acrylic acid or methacrylic acid, may be used in amounts of up to 10%, preferably from 0.5 to 5%, by weight in the composition of the copolymer (A).

Styrene and alkylstyrenes having one to four carbon atoms in the alkyl radical are particularly suitable as optional further olefinically unsaturated monomers whose polymerized units do not react with isocyanates under the reaction conditions; other suitable compounds are acrylonitrile and the abovementioned N-vinyl compounds.

The type and amount of monomers chosen always depend on the copolymer (A) being substantially insoluble in the organic liquid used and on the intended application of the coating composition.

The copolymers obtained are reacted in the usual way with polyisocyanates such as aromatic or araliphatic isocyanates, polyisocyanates, for example toluylene diisocyanate-2,4, toluylene diisocyanate-2,6, diphenylmethane-4,4'-diisocyanate, naphthalene-1,5-diisocyanate, or aliphatic polyisocyanates, for example hexanediisocyanate-1,6, or with the usual compounds known as blocked isocyanates which only react to liberate isocyanate groups at elevated temperature. It is preferred to use polyisocyanates formed by reaction of aliphatic diisocyanates such as propane diisocyanate-1,2, butanediisocyanate-1,2, pentane diisocyanate-1,2, or hexane diisocyanate-1,6 with polyalcohols such as trimethylolpropane, when 1 mole of a diisocyanate is used per hydroxyl group, for example triisocyanates from 1 mole of trimethylolpropane and 3 moles of hexanediisocyanate-1,6. In the reaction of the copolymer with the polyisocyanate, the polyisocyanates may be used in the usual way in about equivalent amounts to the hydroxyl groups or reactive groups in the copolymer, but also in smaller or larger amounts. If desired the usual reaction accelerators, such as tertiary amines or metal compounds, may be added. Curing the coatings may take place at room temperature or at elevated temperature, for example from 80° to 160° C.

Conventional components of surface coatings such as urea-formaldehyde, melamine-formaldehyde or phenol-formaldehyde condensation products, epoxide resins or other vinyl polymers, may be used in minor amounts to achieve certain effects.

The reaction products of polyisocyanates and copolymers containing hydroxyl groups thus obtained are extermely resistant to attack by water and organic liquids. Owing to their low viscosity the coating compositions may be processed far better than prior art surface-coating systems of this type including surface-coating systems based on polyisocyanates and polyethers containing hydroxyl groups or polyesters containing hydroxy groups or conventional reaction products of copolymers containing hydroxyl groups with polyisocyanates. Compared with conventional prior art reaction products of the same type, they have moreover the very important advantage that smaller amounts of polyisocyanates may be used.

Copolymer dispersions according to this invention may be used together with polyisocyanates for the surface coating of metals such as iron, steels of different composition, aluminum or aluminum alloys. They are suitable in the same way for the production of surface coatings on a great variety of woods, glass, ceramic material and the like. In all these applications they exhibit a surprisingly high gloss even when highly pigmented. If the copolymers according to the invention are used for coating the surface of metals there is the advantage of a particularly good flexibility which is attributable to the fact that the coating compositions according to the invention require a relatively low crosslinking density for the production of a complete crosslinking as compared with prior art methods.

The invention is illustrated by the following examples. The parts specified in the examples are parts by weight.

The K values given have been determined according to H. Fikentscher, Cellulose-chemie, 13, 58 et seq. (1932).

EXAMPLE 1

38 parts of a 65% solution of a polymer (B) from 90 parts of 2-ethylhexyl acrylate and 10 parts of 1,4-butanediol monoacrylate in a mixture of xylene and ethyl acetate in the volumetric ratio 5:2 is mixed with 70 parts of gasoline (boiling range for 80° to 140° C.) and heated under nitrogen to 85° to 90° C. Then while stirring 100 parts of a mixture of 22.5 parts of 1,4-butanediol monoacrylate, 101.3 parts of methyl acrylate, 101.3 parts of ethyl acrylate, 285 parts of gasoline (boiling range from 80° to 140° C.) and 4.5 parts of azoisobutyronitrile are added. After the initiation of the polymerization reaction, the remainder of the mixture (about 414 parts) is dripped in within two hours while stirring at 85° to 90° C. After a total of five hours the polymerization is over. The solids content of the resultant copolymer dispersion is 40%. The copolymer has a K value of 19.5 (determined in a 1% solution in ethyl acetate) and a hydroxyl number of 43.

100 parts of the 40% copolymer dispersion is mixed with 2.7 parts of a mixture of 80 parts of 2,4-toluylene diisocyanate and 20 parts of 2,6-toluylene diisocyanate and the mixture is brushed onto stainless iron sheeting. Coatings are obtained which, after having been baked for one hour at 150° C., have a pendulum hardness of 57 seconds (determined according to DIN 53,157) and an Erichsen number of 10 (determined according to DIN 53,156).

EXAMPLE 2

100 parts of a mixture of 22.5 parts of 1,4-butanediol monoacrylate, 101.3 parts of methyl acrylate, 78.8 parts of ethyl acrylate, 22.5 parts of acrylonitrile, 290 parts of gasoline (boiling range from 80° to 140° C.) and 4.5 parts of azoisobutyronitrile is added at 85° C. while stirring under nitrogen to a mixture which consists of 38 parts of a 65% solution of a polymer (B) from 90 parts of 2-ethylhexyl acrylate and 10 parts of 1,4-butanediol monoacrylate in a mixture of xylene and ethyl acetate in the volumetric ratio 5:2 and 70 parts of gasoline (boiling range from 80° to 140° C.). After the polymerization reaction has started, the remainder of the mixture (about 415 parts) is dripped in during the course of two hours. A mobile dispersion is formed which has a solids content of 40%. The hydroxyl number is 43.

100 parts of the 40% dispersion thus prepared is mixed with 2.7 parts of the polyisocyanate described in Example 1 and the mixture is brushed onto stainless iron sheeting. A very elastic coating is obtained which after three days at room temperature has a pendulum hardness of 45 seconds (determined according to DIN 53,157). A coating which has been baked for one hour at 150° C. has a pendulum hardness of 75 seconds and an Erichsen value of 10 (determined according to DIN 53,156).

EXAMPLE 3

38 parts of a 65% solution of a polymer (B) from 77 parts of 2-ethylhexal acrylate, 20 parts of styrene and 3 parts of N-vinylimidazole in a mixture of xylene and ethyl acetate in the volumetric ratio 5:2 is mixed with 70 parts of gasoline (having a boiling range of from 80° to 140° C.) while stirring under nitrogen at 85° to 90° C. Then 100 parts of a mixture of 45 parts of 1,4-butanediol monoacrylate, 78.8 parts of ethyl acrylate, 90 parts of methyl acrylate, 11.2 parts of acrylonitrile, 290 parts of gasoline (boiling range from 80° to 140° C.) and 4.5 parts of azoisobutyronitrile is added. After the polymerization reaction has begun, the remainder of the mixture (about 419 parts) is dripped in within two hours at 85° to 90° C. After a total of five hours, the polymermization is over. The solids content of the dispersion of copolymer (A) is 40% and the hydroxyl number is 78.

100 parts of the copolymer dispersion thus obtained has 4.9 parts of the polyisocyanate of Example 1 added and the mixture is spread onto stainless iron sheeting. The coating has a pendulum hardness of 40 seconds (determined according to DIN 53,157) and an Erichsen number of 10 (determined according to DIN 53,156) after it has been baked for one hour at 150° C.

We claim:
1. A process for the production of coatings by reaction of polyisocyanates with copolymers (A) containing polymerized units of:
   (a) at least 30% by weight of an ester of an olefinically unsaturated carboxylic acid having three to five carbon atoms and an alcohol having one to eight carbon atoms or a vinyl ester of an alkane monocarboxylic acid having two to five carbon atoms or mixtures of these esters;
   (b) from 2 to 40% by weight of an olefinically unsaturated monomer having an alcoholic hydroxyl group; and
   (c) 0 to 15% by weight of an olefinically unsaturated carboxylic acid having three to five carbon atoms with or without other olefinically unsaturated monomers whose polymerized units do not react with isocyanates under the reaction conditions, wherein said reaction of polyisocyanates with copolymers (A) takes place in a medium prepared by mixing the polyisocyanates with a mixture prepared by polymerization of the monomers constituting the copolymer in an organic liquid in the presence of a polymer (B), said copolymer (A) being insoluble in said organic liquid, said organic liquid being unreactive with isocyanates, said polymer (B) having the properties of (i) being compatible with the copolymer (A), (ii) being soluble in the organic liquid, and (iii) having a despersive effect, and said polymer (B) having been prepared from olefinically unsaturated monomers whose polymerized units to at least the extent of 70% by weight do not react with isocyanates under the reaction conditions.

2. A process as claimed in claim 1 wherein the organic liquid used is one which is liquid within a range from −20° C. to +30° C. and has a boiling point of from 30° to 300° C.

3. A process as claimed in claim 1 wherein the organic liquid used is a hydrocarbon or a mixture of a hydrocarbon with an ester.

4. A process as claimed in claim 1 wherein polymer (B) is used in an amount of 1 to 30% by weight with reference to copolymer (A).

5. A process according to claim 1 wherein polymer (B) consists of
   (a) 40 to 95% by weight of at least on ester of an olefinically unsaturated carboxylic acid with an alcohol having from four to eighteen carbon atoms;
   (b) from 5 to 30% by weight of a conventional copolymerizable olefinically unsaturated monomer having an alcoholic hydroxyl group, with or without
   (c) up to 30% by weight of at least one other copolymerizable monomer from the group acrylic acid, methacrylic acid, styrene, N-vinylimidazole, acrylonitrile or N-vinyllactam in polymerized form, with the proviso that the sum of the percentages specified under (a), (b) and (c) is always 100.

6. A process as claimed in claim 1 wherein polymer (B) consists of polymerized units of 70 to 95% by weight of 2-ethylhexyl acrylate and 5 to 30% by weight of butanediol monoacrylate.

7. A process as claimed in claim 1 wherein polymer (B) contains polymerized units of 60 to 80% by weight of 2-ethylhexyl acrylate, 10 to 30% by weight of styrene and 0.5 to 30% by weight of N-vinylimidazole, the sum of the percentages of the polymerized monomers in the polymer (B) being equal to 100.

8. A process as claimed in claim 1 wherein the copolymer (A) contains polymerized units of
(a) 60 to 95% by weight of at least one ester of acrylic acid or methacrylic acid with an alcohol having one to four carbon atoms;
(b) 5 to 25% by weight of butanediol monoacrylate; and
(c) up to 15% by weight of a monomer as specified under (c) in claim 1.

9. A process as claimed in claim 1 wherein toluylene diisocyanate-2,4, toluylene diisocyanate-2,6, diphenylmethane-4,4'-diisocyanate, naphthalene-1,5-diisocyanate, an aliphatic diisocyanate or a compound which reacts only at elevated temperature with liberation of isocyanate groups is used as the polyisocyanate.

10. A process as claimed in claim 1 wherein the organic liquid has a boiling point of from 50° to 200° C.

11. Coatings when produced by a process as claimed in claim 1.

References Cited

UNITED STATES PATENTS 3,244,673  4/1966  Bruin et al. _____ 260—33.6 X

DONALD E. CZAJA, Primary Examiner

M. J. WELSH, Assistant Examiner

U.S. Cl. X.R.

117—124 D, 132 C, 148; 260—77.5 CR, 836, 844, 848, 851, 855, 859 R

PO-1050
(5/69)

UNITED STATES PATENT OFFICE
CERTIFICATE OF CORRECTION

Patent No. 3,632,789  Dated January 4, 1972

Inventor(s) Hans Wilhelm, Heinrich Hartmann, and Klaus Gulbins

It is certified that error appears in the above-identified patent and that said Letters Patent are hereby corrected as shown below:

Column 1, line 2, "OLEFIN" should read -- OLEFINIC --.

Column 6, line 37, "despersive" should read -- dispersive --; line 53, "on" should read -- one --.

Signed and sealed this 30th day of May 1972.

(SEAL)
Attest:

EDWARD M. FLETCHER, JR.
Attesting Officer

ROBERT GOTTSCHALK
Commissioner of Patents